No. 623,513. Patented Apr. 25, 1899.
R. C. BUCKLEY.
COMBINED CULTIVATOR AND SEEDER.
(Application filed Jan. 27, 1899.)
(No Model.)
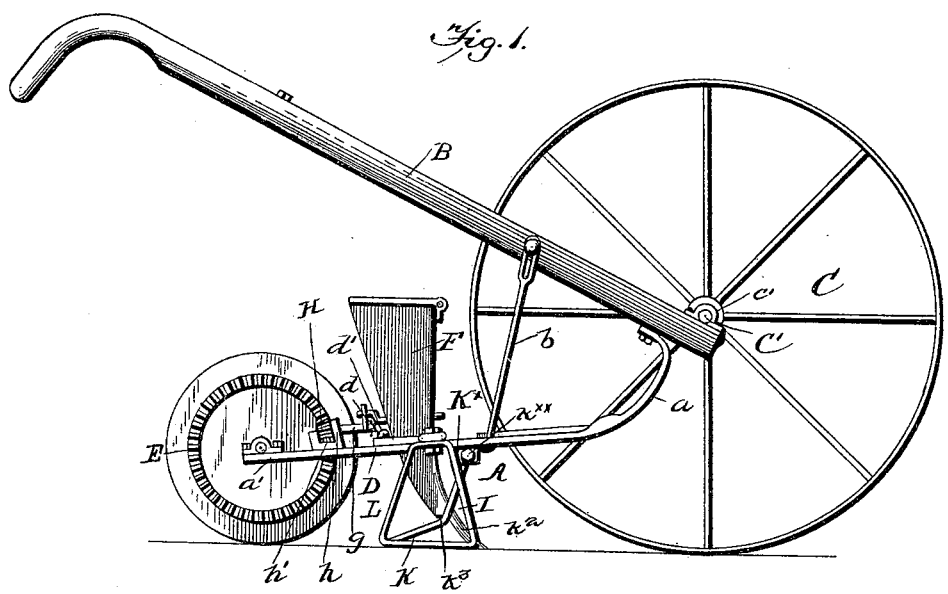
Fig. 1.
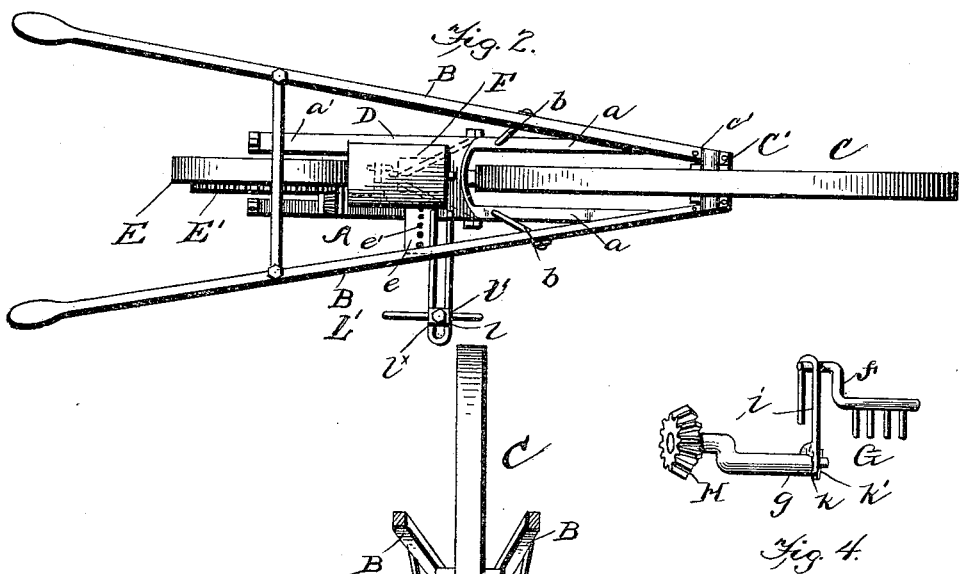
Fig. 2.
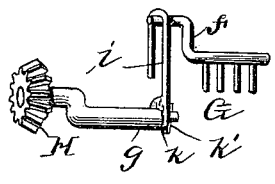
Fig. 4.
Fig. 3.
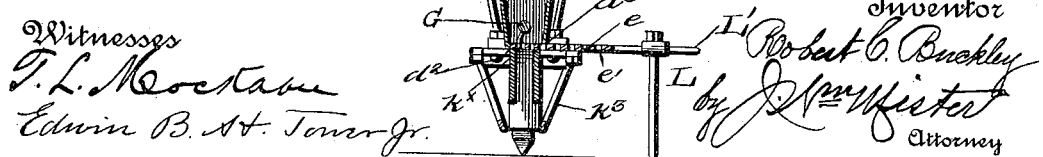
Witnesses
T. L. McCabe
Edwin B. H. Tower Jr.
Inventor
Robert C. Buckley
by J. N. Pfister
Attorney
THE NORRIS PETERS CO., PHOTO-LITHO., WASHINGTON, D. C.

UNITED STATES PATENT OFFICE.

ROBERT COLLET BUCKLEY, OF PEORIA, ILLINOIS.

COMBINED CULTIVATOR AND SEEDER.

SPECIFICATION forming part of Letters Patent No. 623,513, dated April 25, 1899.

Application filed January 27, 1899. Serial No. 703,620. (No model.)

*To all whom it may concern:*

Be it known that I, ROBERT COLLET BUCKLEY, a citizen of the United States, residing at Peoria, in the county of Peoria and State of Illinois, have invented certain new and useful Improvements in a Combined Cultivator and Seeder; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved plow or cultivator and seed-drill combined.

It has for its object, among other things, to plow or prepare the soil and to plant the seed therein and to readily effect the convertibility of the implement from a cultivator into a seeder and conversely from a seeder into a plow or cultivator, while it is also simple, easily constructed or manufactured, and readily operated or handled.

It consists of the parts substantially as hereinafter fully disclosed and specifically pointed out in the claims.

It will be understood that latitude is allowed herein as to details, as such may be changed without departing from the spirit of my invention and the same yet remain intact and be protected.

In the accompanying drawings, illustrating the preferred embodiment of my invention, Figure 1 is a side elevation. Fig. 2 is a plan view of the same. Fig. 3 is a rear sectional elevation taken through the seed-hopper. Fig. 4 is a detailed perspective view disclosing more fully the seed stirrer or agitator and its connected actuating crank-shaft with pinion.

In carrying out my invention I provide a frame-like casting or beam A, preferably with the forward end portions of its lateral bars $a\ a$ curved upward and bolted to the under sides of the parallel handle-bars B B at their lower or forward ends, and through the rear end portions of said lateral bars pass and are secured the lower ends of vertical rods $b\ b$, whose upper ends are suitably secured to and brace in position the handle-bars from said beam.

The single forward wheel C has its axle $C'$ let into bearings $c'$, secured to the upper side of the handle-bars B B at their extreme forward ends, and to the rear end transverse piece $a'$ of the beam or frame A is bolted or secured the forward end of a similar casting or frame D.

E is a roller of suitable weight to properly press or compact the soil, suitably hung between the rear end portions of the lateral bars of the frame D, and having a lateral circular series of cogs or teeth $E'$, whose function will appear presently.

F is the seed hopper or receptacle, secured upon the casting or frame D near its forward end, preferably by two bolts $d$ passed through and nutted to said frame and through a base-flange $d'$ of a socket-like casting $d^2$, adapted to receive and be secured to the lower end of said hopper and resting upon said frame. Inserted laterally through said socket $d^2$ and adapted to be received in a recess $d^3$ in said socket is arranged the seed-slide $e$, having a series of different-sized openings $e'$ in alinement to provide for dropping various-sized seeds.

G is the seed-agitator, arranged within the seed hopper or receptacle F and fixed to or carried by a crank-shaft $f$, bearing in opposite sides of said hopper, said agitator being adapted to loosen up the seed to expedite the passage thereof through the openings in the seed-slide.

H is a pinion or cog-wheel adapted to gear with the circle of cogs or teeth $E'$ of the roller E and whose shaft $g$, which is cranked, is hung in the slotted or bifurcated obliquely-disposed bearings or boxes $h$ at the ends of and integral with a plate or casting $h'$, bolted to the frame D. The crank-arm of the shaft $g$ is connected to the crank-arm of the agitator-shaft $f$ to actuate or oscillate the agitator G, preferably by a pitman or connection $i$, which may be a right-angled bar or wire, with one end slipped upon the crank-arm of shaft $f$ and its other end adapted to be slipped upon the crank-arm of the shaft $g$, a sleeve $k$ being placed upon the latter and a pin $k'$ passed through it to retain said pitman or connection in place.

I is the seed "boot" or chute, fixed to the under side of the casting or frame D in alinement with an opening $k^×$ in said casting, said opening being in alinement with the seed-hopper, and said boot or chute having a plow or furrow-opener $k^2$ fixed thereto in the usual way for the proper delivery of the seed into the ground.

K is the seed-coverer, substantially bail or triangular like in its general outline, with its looped lower end portions trailing or resting upon the ground just in rear of the plow or furrow-opener to act upon and throw the loose earth into the furrow upon the deposited seed, the upper ends of the arms of said bail or coverer being flattened and apertured, and through said ends is passed a headed and nutted bolt $k^{××}$, itself passed through a socket or sleeve $K^×$, integral with the under side of the frame or casting D, while said arms themselves are angular to bring their said lower looped end portions more fully and effectively in contact with the ground for the purpose aforesaid.

L is a marker for acting upon the ground to predetermine the planting operation on the return movement of the machine, preferably substantially a triangle, and adapted to travel parallel with and connected to the machine by an arm L', formed, preferably, of a bent wire rod, with its branches near its outer looped end clamped down upon the top cross portion of said marker or triangle by and let into recesses or notches $l^×$ in a clamp-plate $l$. Through this plate is centrally inserted a bolt $l'$, whose lower end passes through the top cross portion of the marker and nutted thereunder. The inner divergent end portions of said arm are bent downward, one being adapted to pass through a hole in the casting A and the other through coincident holes in the extending or projecting portion of the seed-slide and said casing and nutted thereunder, thus additionally securing the seed-slide in a fixed position temporarily and yet permit the readjustment of the slide when it is desired to shift the same so as to bring into requisition different-sized openings thereof, as will be readily appreciated. This downward-extending end portion of said arm is readily disengaged from the aforesaid parts by unscrewing the nut thereon and springing upward that branch of said arm, when the seed-slide can be moved as required, and after the readjustment of said slide again depressing and securing said end portion in position as before.

The operation of the machine is obvious from the aforesaid description of the construction and arrangement of the several parts. It is further remarked, however, that though regular means is provided to stop the operation of the seeder or the dropping of the seed this may be effected by simply lifting the roller from contact with the ground and the machine readily transported or removed through the forward wheel, as is apparent.

It will be noted that the hopper, as herein shown, being flared laterally outward from bottom to top, will, by laterally tilting the machine to a substantially horizontal position, allow the contents to readily flow out of the same, the same thus being directed down an incline, as will be appreciated, thereby permitting the ready emptying of said hopper when desired.

I claim and desire to secure by Letters Patent—

1. In a seeder and cultivator, or plow, the roller, the crank-shaft geared therewith, the hopper, the agitator hung in said hopper and having its crank-shaft linked or connected to the aforesaid crank-shaft, and the seed-slide arranged in said hopper and having different-sized seed-dropping openings and arranged in juxtaposition with said agitator, substantially as set forth.

2. In a seeder and cultivator, the seed-chute, and the seed-coverer adapted to contact with the ground in rear of said seed-chute, and substantially bail-shaped, whose arms are angular and connected to a bolt passed through a socket in the under side of the carrying-frame, substantially as set forth.

3. In a seeder and cultivator, the seed-slide capable of readjustment, and the marker-carrying arm produced with branches, one adapted to be secured to the carrying-frame and the other having a downward-bent end portion adapted to pass through the projecting portion of said seed-slide and secured to the under side of said carrying-frame, substantially as set forth.

4. In a seeder and cultivator, or plow, the triangular marker, the clamp-plate and its securing-bolt, the arm formed of a bent or doubled wire rod, with its looped end portion let into recesses in said clamp-plate and held upon the top cross portion of said marker by said clamp-plate and said securing-bolt passed centrally through said clamp-plate and said top cross portion of said marker, and secured thereunder, the bent-down end portions of said arm being secured to the seed-slide and to the carrying-frame, substantially as set forth.

5. The combined cultivator, or plow, and seeder comprising the seed-hopper and its supporting-frame and the roller with its shaft bearing in said frame, the crank-shaft geared to said roller, the bearing or support for said crank-shaft, having obliquely-arranged slotted end pieces integral with a base-piece or casting bolted or secured to said carrying-frame, the agitator secured to a crank-shaft hung in said hopper, and connected by a pitman or link to the aforesaid crank-shaft, the seed-slide arranged in the lower end of said seed-hopper, and the seed-drill having the chute, or "boot," and plow, or furrow-opener, and the bail-like coverer pivoted in the under side of said carrying-frame and its looped end arranged in rear of said seed-drill, substantially as set forth.

6. In a combined cultivator and seeder, the hopper or seedbox flared laterally from its bottom outward to its top, substantially as set forth.

In testimony whereof I affix my signature in presence of two witnesses.

ROBERT COLLET BUCKLEY.

Witnesses:
HENRY W. ULRICH,
JOSEPH SCHERRER.